United States Patent
Nakaya et al.

(10) Patent No.: US 9,605,335 B2
(45) Date of Patent: Mar. 28, 2017

(54) HOT-DIP GALVANIZED STEEL SHEET FOR STAMPING HAVING EXCELLENT COLD WORKABILITY, DIE HARDENABILITY, AND SURFACE QUALITY, AND PRODUCING METHOD THEREOF

(71) Applicants: Kobe Steel, Ltd., Kobe-shi (JP); VOESTALPINE STAHL GMBH, Linz (AT)

(72) Inventors: Michiharu Nakaya, Kakogawa (JP); Tatsuya Asai, Kakogawa (JP); Andreas Pichler, Voecklabruck (AT); Thomas Kurz, Linz (AT)

(73) Assignees: Kobe Steel, Ltd., Kobe-shi (JP); VOESTALPINE STAHL GmbH, Linz (AT)

( * ) Notice: Subject to any disclaimer, the term of this patent is extended or adjusted under 35 U.S.C. 154(b) by 273 days.

(21) Appl. No.: 14/379,980

(22) PCT Filed: Mar. 28, 2013

(86) PCT No.: PCT/JP2013/059407
§ 371 (c)(1),
(2) Date: Aug. 20, 2014

(87) PCT Pub. No.: WO2013/147098
PCT Pub. Date: Oct. 3, 2013

(65) Prior Publication Data
US 2015/0044502 A1    Feb. 12, 2015

(30) Foreign Application Priority Data
Mar. 30, 2012   (JP) .................................. 2012-083009

(51) Int. Cl.
*C22C 38/28*    (2006.01)
*C22C 38/32*    (2006.01)
(Continued)

(52) U.S. Cl.
CPC .............. *C23C 2/02* (2013.01); *B32B 15/013* (2013.01); *C21D 8/0236* (2013.01);
(Continued)

(58) Field of Classification Search
None
See application file for complete search history.

(56) References Cited

U.S. PATENT DOCUMENTS

| 7,673,485 B2 | 3/2010 | Imai et al. |
| 7,832,242 B2 | 11/2010 | Brandstatter et al. |

(Continued)

FOREIGN PATENT DOCUMENTS

| JP | 2003-147499 A | 5/2003 |
| JP | 2003-293083 A | 10/2003 |

(Continued)

OTHER PUBLICATIONS

Machine-English translation of JP2007-211276, Kikuchi Sukehisa et al., Feb. 8, 2006.*

(Continued)

*Primary Examiner* — Deborah Yee
(74) *Attorney, Agent, or Firm* — Oblon, McClelland, Maier & Neustadt, L.L.P.

(57) ABSTRACT

Disclosed is a hot-dip galvanized steel sheet for stamping, which has excellent cold workability, has such satisfactory surface quality as to be free from unplating and other defects even in the absence of dedicated facilities, and ensures a strength of 1370 MPa or more after quenching even when cooled at a low rate. Also disclosed is a method effective for the produce of the hot-dip galvanized steel sheet for stamping. The hot-dip galvanized steel sheet for stamping comprises a base steel sheet and a hot-dip galvanized layer on a surface of the base steel sheet, in which the base steel sheet has a predetermined chemical composition and has a micro- (Continued)

structure comprising equiaxed ferrite having an average aspect ratio of 4.0 or less and cementite and/or pearlite having an average major axis of grains of 20 μm or less.

12 Claims, 1 Drawing Sheet

(51) Int. Cl.

| | |
|---|---|
| C21D 8/04 | (2006.01) |
| C23C 2/02 | (2006.01) |
| C23C 2/06 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/38 | (2006.01) |
| C21D 8/02 | (2006.01) |
| B32B 15/01 | (2006.01) |
| C21D 9/48 | (2006.01) |

(52) U.S. Cl.
CPC ......... *C21D 8/0263* (2013.01); *C21D 8/0284* (2013.01); *C21D 8/0436* (2013.01); *C21D 8/0473* (2013.01); *C21D 9/46* (2013.01); *C22C 38/00* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22C 38/38* (2013.01); *C23C 2/06* (2013.01); *C21D 9/48* (2013.01); *C21D 2211/003* (2013.01); *C21D 2211/005* (2013.01); *C21D 2211/009* (2013.01); *Y10T 428/12799* (2015.01)

(56) References Cited

U.S. PATENT DOCUMENTS

| | | |
|---|---|---|
| 7,938,949 B2 | 5/2011 | Brandstatter et al. |
| 2004/0166360 A1 | 8/2004 | Imai et al. |
| 2005/0252262 A1 | 11/2005 | Imai et al. |
| 2007/0271978 A1 | 11/2007 | Brandstatter et al. |
| 2011/0045316 A1 | 2/2011 | Brandstatter et al. |
| 2013/0213534 A1 | 8/2013 | Hikita et al. |

FOREIGN PATENT DOCUMENTS

| | | |
|---|---|---|
| JP | 2004-323944 A | 11/2004 |
| JP | 2007-500285 A | 1/2007 |
| JP | 2007-77466 A | 3/2007 |
| JP | 2007-505211 A | 3/2007 |
| JP | 2007-211276 A | 8/2007 |
| JP | 2007-270331 A | 10/2007 |
| JP | 2007-314817 A | 12/2007 |
| JP | 2010-47786 A | 3/2010 |
| JP | 2011-195957 A | 10/2011 |
| JP | 2011-236483 A | 11/2011 |

OTHER PUBLICATIONS

International Search Report issued Jun. 25, 2013 in PCT/JP2013/059407 (with English Translation).

International Preliminary Report on Patentability and Written Opinion issued Oct. 1, 2014 in PCT/JP2013/059407 (with English Translation).

Hiroshi Kobayashi, "Flangeability Improvement in High Strength Hot Rolled Steel", Current advances in materials and processes, vol. 12, No. 3, Mar. 1, 1999, p. 485.

\* cited by examiner

HOT-DIP GALVANIZED STEEL SHEET FOR STAMPING HAVING EXCELLENT COLD WORKABILITY, DIE HARDENABILITY, AND SURFACE QUALITY, AND PRODUCING METHOD THEREOF

TECHNICAL FIELD

The present invention relates to hot-dip galvanized steel sheets and producing methods thereof, which hot-dip galvanized steel sheets are used in stamped articles (press-formed articles) requiring sufficient strengths and corrosion resistance to be used typically in structural members of automotive parts. Specifically, the present invention relates to hot-dip galvanized steel sheets for stamping, which are excellent cold workability, die hardenability and surface quality; and producing methods of the hot-dip galvanized steel sheets for stamping.

BACKGROUND ART

As one of measures to improve the fuel efficiencies of automobiles so as to solve global environmental issues, reduction in body weight has been promoted. For this purpose, steel sheets having high-strengths as much as possible should be produced for use in automobiles. To produce such high-strength parts, there have been employed more and more techniques, in which a steel sheet (blank) is heated into the austenitic region, formed or shaped in a stamping die while being quenched, and thereby yields high-strength parts. Techniques of this type are roughly classified as (1) a direct technique in which the blank is heated to the austenite region, hot-formed the blank in the die, and quenched as intact in the die; and (2) an indirect technique in which the blank is cold-formed without heating, and the formed article is heated and then quenched in the die.

The direct technique is limited in shapes of the parts, because the blank heated to the austenitic region of 900° C. or higher should be formed into a final shape in one stamping process. In addition, for providing registration holes which require satisfactory dimensional accuracy, drilling should be performed after forming. However, drilling in this technique should be performed on a high-strength steel after quenching and thereby requires laser cutting or another technique which is higher in cost than shearing is.

In contrast, the indirect technique requires cold working and die quenching to be performed separately and thereby requires dies in a larger number, but the technique, when employing a steel sheet excellent cold workability, can advantageously give parts having more complicated shapes than those in the direct technique.

Hot-clip galvanized steel sheets are applied as steel sheets for stamping, from the viewpoints of corrosion resistance of the parts and prevention of the generation of oxidized scale on the steel sheets during heating of the parts. Such hot-dip galvanized steel sheets to be applied to the indirect technique are often applied to parts having complicated shapes and should have large elongation and satisfactory stretch flangeability. In addition, the hot-dip galvanized steel sheets should be free from problems such as peeling of the galvanized layer and powdering upon stamping and should be free from surface defects such as tinplating.

As such techniques, for example, Patent Document 1 to 3 disclose methods for producing parts, which employ galvanized steel sheets and ensure high strengths of the steel sheets after quenching. According to these techniques, the steel sheets to be used are designed to have chemical compositions added with various alloy elements (e.g., Si, Cr, Mn, Ti, and B) so as to ensure the strengths of the parts. These added elements, however, may form oxides on the surface of the material steel sheets (surface of the steel sheets) before dipping in a molten zinc pot in a continuous hot-dip galvanization line and may suffer from an unplated area on the steel sheet surfaces.

To solve this problem, there is an applied technique of performing a oxidization-reduction process and subsequently performing plating. In the oxidization-reduction process, the steel sheet surface is once oxidized to form an iron oxide, and the iron oxide is reduced. However, this technique requires dedicated facilities and needs precise control and regulation of oxidization and reduction conditions therein. If the control of these conditions is unsuitable, even the oxidization-reduction may cause an oxide of the alloy element to partially remain on the surface layer of the base steel sheet before plating, and this causes unplating. The galvanized coating reacts with the base iron to form an alloy upon heating after parts forming. The oxide, when remains on the surface layer of base iron, may cause unevenness in alloying speed.

The unevenness in alloying speed upon part heating causes unevenness in surface emittance, and subsequently causes unevenness in temperature upon heating. The unevenness in temperature upon heating in turn causes unevenness in amount of zinc oxide in the surface layer, and this causes unevenness in coating adhesion and weldability.

A steel sheet, when quenched through water quenching (at a cooling rate of several hundred degrees Celsius per second) or quenched in a special die having an enhanced severity of quenching, can have a high strength because of extremely high cooling rate. However, this technique still requires the addition of alloy elements at a certain level or more, because the stamped article, if having a complicated shape as parts in the indirect technique, may not undergo quenching at a sufficiently high cooling rate in all.

The less alloy elements contained the more advantageous for ensuring cold workability and for preventing imperfect hot-dip galvanization. However, certain amounts of alloy elements should be added so as to ensure stable strengths of the parts after die quenching even when the parts have complicated shapes. Thus, demands are made to give a technique which meets both of these requirements.

PRIOR ART DOCUMENTS

Patent Documents

Patent Document 1: Japanese Unexamined Patent Application Publication No. 2007-505211
Patent Document 2: Japanese Unexamined Patent Application Publication No. 2007-500285
Patent Document 3: Japanese Unexamined Patent Application Publication No. 2004-323944

SUMMARY OF THE INVENTION

Problems to be Solved by the Invention

The present invention has been made under these circumstances, and an object thereof is to provide a hot-dip galvanized steel sheet for stamping, which has excellent cold workability, has such satisfactory surface quality as to be free from defects such as unplating even when produced by a regular reduction process in the absence of dedicated facilities for the oxidation-reduction process, and has satisfactory die hardenability to ensure a strength of 1370 MPa or more after die quenching even performed at a low average cooling rate after placing in the die. Another object of the present invention is to provide a method which is useful to produce the hot-dip galvanized steel sheet for stamping.

Means for Solving the Problems

The present invention has achieved the objects and provides a hot-dip galvanized steel sheet for stamping. The hot-dip galvanized steel sheet comprises a base steel sheet; and a hot-dip galvanized layer formed on a surface of the base steel sheet. The base steel sheet comprises carbon (C) in a content of from 0.20% (meaning "mass %"; hereinafter, the same applies the chemical composition) to 0.24%; silicon (Si) in a content of from greater than 0% to 0.1%; manganese (Mn) in a content of from 1.20% to 1.5%; phosphorus (P) in a content of from greater than 0% to 0.02%; sulfur (S) in a content of from greater than 0% to 0.002%; chromium (Cr) in a content of from 0.21% to 0.5%; titanium (Ti) in a content of from 0.02% to 0.05%; solute aluminum (sol. Al) in a content of from 0.02% to 0.06%; and boron (B) in a content of from 0.001% to 0.005%, with the balance consisting of iron and inevitable impurities, wherein the base steel sheet has a microstructure comprising: equiaxed ferrite having an average aspect ratio of 4.0 or less; and at least one of cementite and pearlite each having an average major axis of grains of 20 µm or less.

The present invention further provides a method for producing a hot-dip galvanized steel sheet for stamping. The method comprises the steps of heating a steel slab to a temperature of from 1150° C. to 1300° C., the steel slab having the chemical composition as defined above; hot-rolling the heated steel slab at a finish temperature of from 850° C. to 950° C. to give a steel sheet; coiling the steel sheet after hot rolling at a temperature in the range of from 550° C. to 700° C.; cold rolling the steel sheet after coiling to a rolling reduction of from 30% to 70%; annealing the steel sheet after cold rolling at an annealing maximum temperature of from 700° C. to 800° C. for a holding time in a temperature range of from 700° C. to 800° C. of from 10 seconds to 600 seconds; further cooling the steel sheet after annealing to 500° C. or lower; and performing hot-dip galvanization on the steel sheet after cooling; wherein the annealing is performed under such conditions as to satisfy a condition specified by Expression (1);

$$15000 \leq [(T/100)^{3.5}] \times t \leq 100000 \tag{1}$$

where T represents the annealing maximum temperature (° C.); and t represents the holding time (second) in a temperature range of from 700° C. to 800° C.

Effects of the Invention

The present invention can provide a hot-dip galvanized steel sheet for stamping which has excellent cold workability, has satisfactory surface quality, and ensures a strength of 1370 MPa or more after die quenching even performed at a low cooling rate (i.e., has satisfactory die hardenability). This is achieved by precisely specifying the chemical composition of the base steel sheet and whereby allowing the base steel sheet to have a microstructure containing equiaxed ferrite having an average aspect ratio of 4.0 or less; and at least one of cementite and pearlite each having an average major axis of grains of 20 or less.

MODE FOR CARRYING OUT THE INVENTION

The present inventors made various investigations to provide a steel sheet which is a hot-clip galvanized steel sheet for stamping advantageously usable typically in the indirect technique and which has all properties of cold workability (elongation and stretch flangeability), hardenability upon quenching at a lower cooling rate than those in customary techniques, prevention of defects such as unplating, and prevention of unevenness in corrosion resistance after heat treatment of the parts. The lower cooling rate may refer typically to an average cooling rate of a work after placing in a die of from about 20° C. to about 100° C. in a temperature range of from around the $Ac_3$ point to 200° C. As a result, the present inventors have found that a hot-dip galvanized steel sheet for stamping, which meets the above objects, can be obtained (i) by precisely specifying the chemical composition of the base steel sheet within a narrow range, particularly controlling the Si content to an extremely low level of 0.1% or less to prevent unplating even when the oxidization-reduction process is not applied; and (ii) by allowing the base steel sheet to have a microstructure containing equiaxed ferrite in combination typically with fine cementite and/or fine pearlite. The present invention has been made based on these findings.

The hot-dip galvanized steel sheet for stamping according to the present invention should be suitably controlled in chemical composition and microstructure (microstructure before die quenching) of the base steel sheet. The ranges of these conditions are set for the following reasons.

[Carbon (C) in a Content of from 0.20% to 0.24%]

Carbon (C) element is necessary for ensuring a satisfactory strength of the stamped article (part) after die cooling. For this purpose, the carbon content should be 0.20% or more. However, carbon, if contained in excess, may cause the steel sheet to have insufficient weldability and cold workability. To prevent this, the carbon content should be 0.24% or less. The carbon content is preferably 0.21% or more in its lower limit; and is preferably 0.23% or less in its upper limit.

[Silicon (Si) in a Content of from Greater than 0% to 0.1%]

The base steel sheet, when being controlled to have a Si content of 0.1% or less, becomes resistant to unplating even when an oxidation-reduction process is not applied (even when dedicated facilities are absent, and the work is subjected to a regular reduction process). Specifically, Si, if contained in a content of from greater than 0.1%, forms, during reducing annealing, an oxide film on the surface of the base steel sheet before plating, but a hot-dip galvanized coating does not attach to such oxide film, and this causes unplating. An oxide, even being trivial as not to cause unplating, may cause unevenness in alloying reaction which proceeds in the furnace upon heating of the parts, and this may cause unevenness in surface emittance and, in addition, may cause unevenness in temperature. The unevenness in temperature during heating of the parts before quenching as above may cause unevenness in strength of the parts.

In addition, Si in the base steel sheet migrates into the hot-dip galvanized surface layer upon heating to form silicon oxides in the outermost layer. Such silicon oxides, if adversely affecting the application property of paint, should be removed typically by shot blasting. This causes the productivity of the parts to be lowered, because it takes a long time to remove the silicon oxides. A base steel sheet having a controlled Si content of 0.1% or less as in the present invention may ensure a good appearance and may be resistant to the problems upon heat treatment. The Si content is preferably 0.08% or less, and more preferably 0.05% or less. Though not critical, the Si content may be typically 0.01% or more, and particularly preferably 0.02% or more in terms of its lower limit.

[Manganese (Mn) in a Content of from 1.20% to 1.5%]

Manganese (Mn) element is necessary for ensuring satisfactory strength of the parts during die cooling. For exhibiting these advantages, the base steel sheet for use in the present invention should essentially have a Mn content of 1.20% or more. However, Mn, if contained in excess, may cause a banding microstructure to fail to ensure the formation of equiaxed ferrite. Such excess Mn may also cause the steel sheet to have a lower $Ac_3$ transformation temperature, and this may cause easy formation of austenite during annealing in the hot-dip galvanization line. Austenite, if once formed, often causes bainite and martensite formation during the subsequent cooling process, resulting in insufficient cold workability. Mn may also cause unplating, though it less causes than Si does. To prevent these, the Mn content should be 1.5% or less. The Mn content is preferably 1.22% or more and particularly preferably 1.24% or more in terms of its lower limit; and is preferably 1.40% or less and particularly preferably 1.30% or less in terms of its upper limit.

[Phosphorus (P) in a Content of from Greater than 0% to 0.02%]

Phosphorus (P) element adversely affects the weldability and cold brittleness in the parts after quenching. To prevent this, the phosphorus content should be controlled to 0.02% or less and is preferably 0.015% or less and more preferably 0.010% or less.

[Sulfur (S) in a Content of from Greater than 0% to 0.002%]

Sulfur (S) element forms inclusions such as MnS, thereby impairs the cold workability, causes the parts to be cracked readily upon deformation of the parts by collision, and lowers the weldability. Thus, sulfur is preferably minimized. From these view points, the sulfur content should be controlled to 0.002% or less, and is preferably 0.0015% or less, and more preferably 0.0010% or less.

[Chromium (Cr) in a Content of from 0.21% to 0.5%]

Chromium (Cr) element is necessary for ensuring the parts to have a strength of 1370 MPa or more after die quenching and subsequent die cooling. In particular, the base steel sheet having a reduced Si content should essentially contain Cr in a content of from 0.21% or more so as to ensure the satisfactory strength. However, the Cr content should be 0.5% or less, because Cr, if contained in excess, may cause the formation of bainite and martensite in the hot-dip galvanization line to thereby impair the cold workability. Cr may also cause unplating, though it less causes than Si does. The Cr content is preferably 0.23% or more in terms of its lower limit; and is preferably 0.40% or less and particularly preferably 0.30% or less in terms of its upper limit.

[Titanium (Ti) in a Content of from 0.02% to 0.05%]

Titanium (Ti) element is necessary for allowing the parts to have a satisfactory strength of 1370 MPa or more. If nitrogen (N) is combined with boron (B) to form a nitride, the nitride causes the steel sheet to have ins efficient hardenability. Titanium fixes solute nitrogen (N) as TiN and thereby prevent this problem. To exhibit such effects, the Ti content should be 0.02% or more. However, Ti if contained in excess, may impede recrystallization during annealing in the hot-dip galvanization line and may cause the steel to fail to contain equiaxed ferrite and to thereby have insufficient cold workability. To prevent these, the Ti content should be 0.05% or less. The Ti content is preferably 0.03% or more in terms of its lower limit and is preferably 0.04% or less in terms of its upper limit.

[Solute Aluminum (Sol. Al) in a Content of from 0.02% to 0.06%]

Solute aluminum (sol. Al) acts as a deoxidizer. For this purpose, solute aluminum should be contained in a content of from 0.02% or more. However, solute aluminum, if contained in an excessively high content of more than 0.06%, may cause excessive inclusions, resulting in insufficient cold workability. The solute aluminum content is preferably 0.030% or more in terms of its lower limit; and is preferably 0.050% or less in terms of its upper limit.

[Boron (B) in a Content of from 0.001% to 0.005%]

Boron (B) element is effective for more satisfactory hardenability and is necessary for ensuring satisfactory strength of the parts through die cooling. To exhibit these effects, the boron content should be 0.001% or more, and is preferably 0.0020% or more, and more preferably 0.0025% or more. However, if boron is contained in excess, its effects are saturated. To prevent this, the boron content should be 0.005% or less, and is preferably 0.0045% or less, and more preferably 0.0040% or less.

The base steel sheet for use according to the present invention has the chemical composition as described above, and the balance consisting of iron and inevitable impurities (e.g., N, O, Sb, Sn, and so on).

The base steel sheet for use according to the present invention has a microstructure (microstructure before die quenching), which contains equiaxed ferrite as a matrix, and at least one of cementite and pearlite grains having an average major axis of grains of 20 μm or less (hereinafter also referred to as "fine cementite" and "fine pearlite") dispersed in the ferrite grains or at grain boundaries of ferrite. Elongation at certain level can be ensured by completing recrystallization and whereby reducing the strength of the steel sheet. However, to achieve elongation and stretch flangeability both at high levels, the completion of recrystallization is not enough, but the microstructure as specified in the present invention is required.

[Equiaxed Ferrite]

For imparting satisfactory cold workability to the steel sheet, the ferrite should be equiaxed ferrite. As used herein the term "equiaxed" refers to a ferrite grain having an average of aspect ratios of 4.0 or less. The term "aspect ratio" herein refers to the ratio of a ferrite grain size in the rolling direction to a ferrite grain size in the thickness direction [(rolling direction grain size)/(thickness direction grain size)]. An average of the aspect ratios is hereinafter referred to as an "average aspect ratio". Ferrite grains, if having an average aspect ratio of more than 4.0, may cause the steel sheet to be inferior both in elongation and stretch flangeability. Specifically, a "ferrite grain having an average aspect ratio of greater than 4.0" is a ferrite grain extending in the rolling direction. This microstructure may fail to provide good elongation and satisfactory stretch flangeability, resulting in deterioration in cold workability. One of the deterioration in cold workability may be probably as follows. In addition to the presence of not-completely recrystallized grains, such ferrite extending in the rolling direction, even if completely recrystallized, may more suffer from nonuniform propagation of working strain and from inferior work hardenability, as compared to the equiaxed microstructure. The average aspect ratio of ferrite grains is desirably near to 1 as near as possible, is preferably 3.5 or less, more preferably 3.0 or less, particularly preferably 2.5 or less, and most preferably in the neighborhood of 1.

[Fine Cementite and/or Fine Pearlite]

The base steel sheet for use according to the present invention contains cementite and/or pearlite in grains of the ferrite or at grain boundaries of the ferrite, as described above. For ensuring good cold workability, cementite grains should have an average of major axes (greatest dimensions) of grains (average major axis of grains) of 20 µm or less. Cementite grains, if having an average major axis of grains of more than 20 µm, may cause cracks during cold working, and this may cause the steel sheet to have elongation and stretch flangeability at insufficient levels. The producing method according to the present invention as mentioned below facilitates the formation of not pearlite but cementite. Pearlite grains, when present, should also have an average major axis of grains of 20 µm or less as with cementite grains. The average major axis of cementite and/or pearlite grains is preferably 15 µm or less, more preferably 10 µm or less, and particularly preferably 5 µm or less.

As used herein the term "cementite" contains neither carbides precipitated in bainite nor extremely fine cementite which is formed in tempered martensite and strengthens the steel. From these viewpoints, the average major axis of cementite grains is preferably 0.5 µm or more and more preferably 1 µm or more in terms of its lower limit.

The base steel sheet for use according to the present invention should contain equiaxed ferrite as a main phase in combination with pearlite and/or cementite. As used herein the term "main phase" refers to that the equiaxed ferrite occupies in a percentage (area percentage) of 50% or more of the entire microstructures. The area percentage is preferably from 60% to 95%.

Though the base steel sheet for use herein may contain exclusively the equiaxed ferrite and at least one of the fine cementite and the fine pearlite (in a total content of 100%), it may further contain any of other microstructures such as bainite, martensite, and retained austenite. However, the presence of bainite and/or martensite may cause the base steel sheet to have elongation and stretch flangeability at insufficient levels. To prevent this, a total content of the other microstructures is preferably controlled to 5 area or less based on the total area of entire microstructures.

Identification of microstructures of the base steel sheet according to the present invention may be performed in the following manner. The microstructures contain ferrite in combination with at least one of cementite and pearlite constituting the steel sheet; as well as bainite, martensite, and other microstructures that can be migrated into the steel upon producing.

Initially, a steel sheet sample having a size of 20 mm wide by 20 mm long is sampled, and microstructures at a position one-fourth deep from the surface in the thickness direction are observed.

Of the microstructures, pearlite and cementite may be identified by etching the sample with picric acid and identifying these microstructures by observation with a scanning electron microscope (SEM), followed by measurement of major axes (maxim diameters) of respective grains. The measurement with the SEM may be performed at such a magnification as to enable accurate measurement of major axes (greatest dimensions) of the grains. In experimental examples mentioned below, arbitrary 200 grains are examined with the SEM at a 3000-fold magnification, and the average of the 200 measurements was determined as an average major axis of pearlite or cementite grains.

The average aspect ratio of ferrite grains may be determined by etching the sample with a Nital solution, identifying microstructures with observation under an SEM or an optical microstructure so as to observe ferrite grain boundaries, measuring, of ferrite, a grain size in the thickness direction and a grain size in the rolling direction, and determining an average aspect ratio of ferrite grains. The determination of ferrite grain sizes may be performed by an intercept method or by an image analysis. In any of the intercept method or the image analysis, it is desirable to determine the average of measurements in five fields of view at a 1000-fold magnification. In the experimental examples as mentioned below, microstructures were identified with the SEM, and an average of measurements in the five fields of view was determined by the intercept method.

The area percentages of bainite and martensite may be determined by etching the sample with a Nital solution, identifying microstructures under observation with the SEM, and determining the area percentages through image analysis or point counting. In the experimental examples as mentioned below, the area percentages were determined by observing and measuring microstructures in five fields of view at a 1000-fold magnification through image analysis, and averaging the measurements. It is also acceptable in the SEM observation that bainite and martensite grains are once identified at a higher magnification than the 1000-fold magnification, and then image analysis is performed in five fields of view with the SEM at a 1000-fold magnification as above.

To produce the base steel sheet according to the present invention, the producing conditions should also be precisely controlled. To form the above-specified microstructures, the base steel sheet should be produced in the following manner. Specifically, a steel slab having the above-specified chemical composition is heated to a temperature of from 1150° C. to 1300° C., subjected to hot rolling at a finish temperature of from 850° C. to 950° C., coiled at a temperature in the range of from 550° C. to 700° C., cold-rolled to a rolling reduction of from 30% to 70%, annealed at an annealing maximum temperature of from 700° C. to 800° C. for a holding time of from 10 seconds to 600 seconds in a temperature range of from 700° C. to 800° C. under such conditions as to satisfy Expression (1), and cooled down to a temperature of 500° C. or lower, followed by hot-dip galvanization. These conditions are specified herein for reasons mentioned below. Expression (1) is expressed as follows:

$$15000 \leq [(T/100)^{3.5}] \times t \leq 100000 \qquad (1)$$

where T represents the annealing maximum temperature (° C.); and t represents the holding time (second) in a temperature range of from 700° C. to 800° C.

[Slab Heating Temperature: 1150° C. to 1300° C.]

The slab, if heated to an excessively low temperature, may require an excess load upon hot rolling. To prevent this, the slab should be heated to a temperature of 1150° C. or higher. However, the slab, if heated at an excessively high temperature of higher than 1300° C., may fail to form the target equiaxed ferrite after hot-dip galvanization. This is probably because the microstructure upon hot rolling is a duplex (or multiplex) grain microstructure. In addition, a larger amount of scale is generated, resulting in a lower yield. The slab heating temperature is preferably from 1180° C. to 1250° C.

[Hot Rolling Finish Temperature: 850° C. to 950° C.]

Hot rolling, if performed at a finish temperature of lower than 850° C., may cause the steel sheet after hot rolling to have an ununiform microstructure and to fail to contain the target equiaxed ferrite after hot-dip galvanization. The finish temperature is preferably 880° C. or higher. However, hot rolling, if performed at a finish temperature of higher than 950° C., may cause the steel sheet to be susceptible to surface flaws due to scale and may lead to poor appearance after plating. To prevent this, the finish temperature should be 950° C. or lower, and is preferably 920° C. or lower.

[Coiling Temperature: 550° C. to 700° C.]

Coiling, if performed at a temperature of lower than 550° C., may cause an excessively high strength of the steel sheet after hot rolling, and this may impede the subsequent cold rolling. The coiling temperature is preferably 570° C. or higher. However, coiling, if performed at a temperature of higher than 700° C., may cause banding pearlite, and such banding pearlite may be resistant to reduction in size even when the base steel sheet is subsequently subjected to cold rolling and annealing. The coiling temperature is preferably 670° C. or lower, and more preferably 650° C. or lower.

[Rolling Reduction (Cold Working Ratio): 30% to 70%]

Cold rolling, if performed to a rolling reduction of less than 30%, may not give equiaxed ferrite due to insufficient proceeding of recrystallization and may fail to give fine cementite and/or fine pearlite microstructure due to insufficient dividing of pearlite after hot rolling. The rolling reduction is preferably 40% or more. The rolling reduction may be 70% or less in terms of its upper limit, in consideration of facility capacity of the cold rolling equipment. As used herein the term "rolling reduction" refers to a cold working ratio as specified by Expression (2) as follows:

Rolling Reduction (%)=[((Steel sheet thickness before cold rolling)−(Steel sheet thickness after cold rolling))/(Steel sheet thickness before cold rolling)]×100     (2)

[Annealing Maximum Temperature: 700° C. to 800° C.]

The annealing maximum temperature (annealing preset temperature) in the hot-clip galvanization line should be 700° C. or higher in terms of its lower limit. The steel sheet, if undergone annealing at a maximum temperature of lower than 700° C., may fail to exhibit good cold workability, because recrystallization does not sufficiently proceed, resulting in remaining of the rolling texture. In addition, the steel sheet may suffer from poor appearance due to insufficient control of reduction of the steel sheet surface before plating. In contrast, the steel sheet, if undergone annealing at a maximum temperature of higher than 800° C., may suffer from excessive formation of austenite, may thereby si lifer from migration of bainite and martensite into the microstructure during the subsequent cooling process, and may suffer from inferior cold workability due to an excessively increased strength. The annealing maximum temperature is preferably from 730° C. to 780° C.

[Holding Time in Temperature Range of from 700° C. to 800° C.: 10 Seconds to 600 Seconds]

As used herein the term "time of holding in a temperature range of from 700° C. to 800° C. (holding time)" refers to a total time necessary to pass through the temperature range. Specifically, the holding time refers to a total time including a heating time (temperature elevating time) in heating from 700° C. to the annealing maximum temperature; and a cooling time in cooling from the annealing maximum temperature down to 700° C. The holding time in the temperature range herein is from 10 seconds to 600 seconds. The steel sheet, if held in the temperature range for a holding time of less than 10 seconds, may fail to exhibit good cold workability due to insufficient proceeding of recrystallization and remaining of the rolling texture. In addition, the steel sheet may suffer from poor appearance due to insufficient control of reduction of the steel sheet surface before plating. The holding time should be 600 seconds or shorter in terms of its upper limit, because an excessively long holding time requires a large and long annealing furnace. The holding time is preferably from 50 seconds to 500 seconds.

[Relational Expression (Expression (1)) Between Annealing Maximum Temperature and Holding Time in Temperature Range of 700° C. To 800° C.]

Recrystallization is completed by performing annealing at an annealing maximum temperature of 700° C. or higher for a holding time in a temperature range of from 700° C. to 800° C. of 10 seconds or longer, as described above. However, the desired microstructure of equiaxed ferrite in combination with fine pearlite and/or fine cementite may not always be obtained by annealing merely under these conditions. In addition to the above conditions, the annealing may be performed while controlling an "A-value" of 15000 or more, and preferably 30000 or more to give the microstructure of equiaxed ferrite in combination with fine pearlite and/or fine cementite. See Test No. 18 in Table 5, in which the A-value alone was out of the specific condition. The A-value is a value specified by the annealing maximum temperature T (° C.) and the holding time t (second) in a temperature range of from 700° C. to 800° C.[[(T/100)$^{3.5}$]× t].

In contrast, annealing, if performed at an annealing maximum temperature of 700° C. or higher but for an excessively long holding time in a temperature range of from 700° C. to 800° C., may cause austenite, and this may transform into low-temperature transformation products such as bainite and martensite after cooling, and the steel sheet may suffer from inferior elongation (EL) and stretch flangeability (2) due to an excessively high strength thereof. If the A-value is excessively large, particularly, the desired microstructure is not obtained likewise, resulting in insufficient cold workability (see Test No. 16 in Table 5). To prevent these, the A-value [[(T/100)$^{3.5}$]×t] should be 100000 or less and is preferably 80000 or less.

Though not limited, the annealing is preferably performed entirely in a reducing atmosphere. As used herein the term "reducing atmosphere" refers to such an atmosphere condition that no iron oxide is generated. This can be controlled by regulating the air-fuel ratio and dew point. In a steel sheet containing, for example, Si in a content of from greater than 0.1%, unplating may be suppressed by treating the steel sheet in an oxidative atmosphere to form an iron oxide in the surface layer and then reducing the iron oxide. However, the steel sheet according to the present invention does not need this process, because it contains Si in a controlled low content and contains Cr and Mn in suitably regulated contents. Specifically, the steel sheet according to the present invention does not need an oxidization-reduction process, can be produced by a regular reduction process, and does not require dedicated facilities.

After the annealing is performed as above, the steel sheet is cooled. Upon cooling, the steel sheet is cooled in a time of preferably from 5 seconds to 60 seconds, more preferably 10 seconds or more, and more preferably 45 seconds or less, in a temperature range of from the annealing maximum temperature down to 600° C.

However, after this cooling, the steel sheet should be further cooled down to 500° C. or lower before being immersed in the plating bath. If the temperature of the steel sheet at the time when it is immersed into the plating bath (i.e., plating start temperature) is higher than 500° C., the steel sheet may suffer from poor plating appearance due to an elevated temperature of the plating bath. The temperature control by cooling down to 500° C. or lower is also effective for preventing unintended alloying of the galvanized layer, because, if the steel sheet at an excessively high temperature is immersed into the plating bath, alloying of the galvanized layer may proceed even with no alloying treatment. The plating start temperature is preferably 480° C. or lower, and 350° C. or lower.

However, the temperature at which the steel sheet is immersed into the plating bath (i.e., cooling stop temperature) is preferably 350° C. or higher. The steel sheet, if cooled down to a temperature lower than 350° C. before immersion, may suffer from the generation of a martensite phase and may thereby have insufficient cold workability. The cooling stop temperature is more preferably 400° C. or higher.

The base steel sheet obtained in the above manner is subjected to hot-dip galvanization. This gives a galvanized steel sheet containing the base steel sheet and a galvanized layer on a surface of the base steel sheet. The resulting galvanized layer is preferably formed in a mass of coating of from about 50 to about 90 g/m² and preferably has an iron content of 5% or less.

For ensuring sufficient corrosion resistance upon use as parts, the mass of coating is preferably 50 g/m² or more, and more preferably 60 g/m² or more. For preventing deterioration in weldability, the mass of coating is preferably 90 g/m² or less, and more preferably 80 g/m² or less in terms of its upper limit.

The iron content in the galvanized layer is preferably 5% or less for reasons as follows. Alloying proceeds during heating of the parts after cold working. If the base steel sheet has already undergone alloying, the resulting parts may suffer from excessive alloying during the heating and may thereby have inferior corrosion resistance. The galvanized layer, if containing iron in an excessively high content, may suffer from working failure upon cold working, which working failure is so-called powdering in which the plating layer is powdered. In particular, when a plating layer formed in a mass of coating of 60 g/m² or more is subjected to an alloying treatment, iron migrates insufficiently to the galvanized surface layer and is formed in a high content at the interface between the base iron and the plating layer, and this may often cause powdering. To prevent this, the galvanized layer has an iron concentration of preferably 5% or less, and more preferably 4% or less.

Where necessary, the hot-dip galvanized steel sheet obtained in the above manner may be, after being cooled down to mom temperature, subjected to temper rolling so as to remove yield elongation.

The hot-dip galvanized steel sheet for stamping according to the present invention can have good cold workability (elongation and stretch flangeability) by allowing the base steel sheet to contain added elements (chemical composition) controlled within narrow ranges and to have a predetermined microstructure. Of these properties, the stretch flangeability may be evaluated through a hole expanding test in terms of a hole expansion ratio λ. Specifically, the hot-dip galvanized steel sheet for stamping satisfies the following properties.

[Cold Workability]

Elongation (total elongation EL): 18% or more (preferably 23% or more, and more preferably 25% or more).

Stretch flangeability (hole expansion ratio λ): 40% or more (preferably 45% or more, and more preferably 55% or more).

[Surface Quality]

The hot-dip galvanized steel sheet for stamping according to the present invention also has satisfactory surface quality. Specifically, the hot-clip galvanized steel sheet is resistant to defects such as unplating only by a regular reduction process even in the absence of dedicated facilities for the oxidization-reduction process.

[Die Hardenability]

The hot-dip galvanized steel sheet for stamping according to the present invention also has satisfactory die hardenability. Specifically, the hot-dip galvanized steel sheet can surely have a high strength of 1370 MPa or more after die quenching even when subjected to die cooling through low rate cooling at an average cooling rate of from about 20° C. to about 100° C. per second in a temperature range of from around the $Ac_3$ point to 200° C.

In addition, the hot-dip galvanized steel sheet according to the present invention has a strength being stable within a specific range and has good dimensional accuracy. The hot-dip galvanized steel sheet can also be used for hot working, because the working force required for blanking and drilling of the steel sheet is stable.

The present invention will be illustrated in further detail with reference to several experimental examples below. It should be noted, however, that these examples are never intended to limit the scope of the invention; various changes and modifications may be made without departing from the scope and spirit of the invention and all fall within the scope of the invention

EXAMPLES

Experimental Example 1

Ingots of material steels (Steels A to D and G) having chemical compositions given in Table 1 below were prepared by melting (ingot-making), subjected to hot rolling under conditions below, acid-washed to remove scale on the surface layer, subjected to cold rolling (cold rolling to a thickness of 1.5 mm), and subjected to a heat treatment under simulated conditions using a heat treatment simulator as in a continuous hot-dip galvanization line. In this experimental example, samples were not subjected to hot-dip galvanization in practice, and their surface quality after hot-dip galvanization was not evaluated.

[Hot Rolling Conditions]

Heating temperature: 1200° C.
Finish temperature: 890° C.
Coiling temperature: 600° C.
Finish thickness: 3.0 mm (cold working ratio: 50%)

[Continuous Annealing Simulator]

Heat treatment conditions in the continuous hot-dip galvanization line were simulated in the heat treatment simulator. Specifically, the steel sheets were heated to a predetermined temperature range (annealing maximum temperature T; as given Table 2 below) at a rate of 10°

C./second and held at that temperature for a predetermined time (holding time at the annealing maximum temperature T). The heating was performed in a reducing atmosphere (non-oxidizing atmosphere). The steel sheets were cooled from the annealing maximum temperature T down to 600° C. in 30 seconds, further cooled from 600° C. down to 460° C. at an average cooling rate of 15° C./second, held at 460° C. for 30 seconds, and then cooled down to room temperature. The heat treatment conditions (annealing conditions) in this process are indicated in following Table 2, together with the holding time t in a temperature range of from 700° C. to 800° C. and the A-value $\{[(T/100)^{3.5}] \times t\}$. The holding time t in the temperature range of from 700° C. to 800° C. indicated in Table 2 is a time including the heating time (temperature elevating time) from 700° C. to the annealing maximum temperature T, and the cooling time from the annealing maximum temperature T down to a temperature of lower than 700° C. This is also applied to Table 5 below.

TABLE 1

| | Chemical composition* (in mass %) | | | | | | | | |
|---|---|---|---|---|---|---|---|---|---|
| Steel | C | Si | Mn | P | S | Cr | sol. Al | Ti | B |
| A | 0.21 | 0.02 | 1.24 | 0.008 | 0.001 | 0.24 | 0.042 | 0.038 | 0.0032 |
| B | 0.23 | 0.25 | 1.18 | 0.007 | 0.002 | 0.22 | 0.45 | 0.035 | 0.0003 |
| C | 0.22 | 0.21 | 1.27 | 0.009 | 0.003 | 0.28 | 0.041 | 0.002 | 0.0028 |
| D | 0.15 | 0.24 | 1.41 | 0.007 | 0.002 | 0.31 | 0.049 | 0.031 | 0.0032 |
| G | 0.23 | 0.05 | 1.98 | 0.011 | 0.001 | 0.45 | 0.045 | 0.045 | 0.0030 |

*Balance: Iron and inevitable impurities

TABLE 2

| | | Annealing conditions | | | |
|---|---|---|---|---|---|
| Test No. | Steel | Annealing maximum temperature T (° C.) | Holding time at annealing maximum temperature T (second) | Holding time t in temperature range of from 700° C. to 800° C. (second) | A-value |
| 1 | A | 720 | 50 | 54 | 54083 |
| 2 | A | 780 | 40 | 56 | 74220 |
| 3 | A | 870 | 60 | 94 | 182577 |
| 4 | B | 780 | 40 | 56 | 74220 |
| 5 | C | 780 | 40 | 56 | 74220 |
| 6 | D | 780 | 40 | 56 | 74220 |
| 7 | G | 790 | 50 | 68 | 94233 |

The resulting specimens were observed on microstructure of the base steel sheet and were subjected to tensile tests and hole expanding tests according to methods mentioned below, to examine mechanical properties (yield point YP, tensile strength TS, total elongation EL, and hole expansion ratio λ). The specimens were also subjected to quenching under following conditions (heat treatment tests) and were examined on strength (tensile strength TS) after the quenching.

[Microstructure Observation]

A steel sheet sample of a size of 20 mm long by 20 mm wide was sampled, and the microstructures of the sample present in a position of one-fourth deep in the thickness direction were observed in the following manner.

Pearlite and cementite were observed in the following manner. The sample was etched with picric acid, and microstructures were identified with observation under an SEM at a 3000-fold magnification. Major axes of cementite and pearlite grains were measured each on arbitrary 200 grains, averaged, and defined as average major axis of pearlite and cementite grains, respectively.

Ferrite was observed in the following manner. The sample was etched with a Nital solution, microstructures were identified with observation under an SEM at a 1000-fold magnification. On ferrite, a grain size in the thickness direction (major axis) and a grain size in the rolling direction (minor axis) were measured by the intercept method, and ratios (aspect ratios) of the major axis to the minor axis were calculated. In this process, measurement was performed in five fields of view, and measured values were averaged to give an average aspect ratio.

Bainite and martensite were observed in the following manner. The sample was etched with a Nital solution, microstructures were identified with observation under an SEM at a 1000-fold magnification in five fields of view, and area percentages of the target microstructures were determined through image analysis, and the measured values were averaged to give area percentages of bainite and martensite.

[Tensile Test]

A JIS (Japanese Industrial Standard) No. 5 tensile specimen was sampled and subjected to a tensile test, in which the specimen was pulled in a direction perpendicular to the rolling direction, to measure mechanical properties (yield point YP, tensile strength TS, and total elongation EL). An acceptance criterion for total elongation EL as cold workability is 18% or more.

[Hole Expanding Test]

The hole expanding test was performed in accordance with the Japan Iron and Steel Federation Standard JFS T1001. An acceptance criterion for hole expansion ratio λ, as cold workability is 40% or more.

[Heat Treatment Test]

To evaluate the strength after a heat treatment (after quenching), a small specimen (cut sheet) of a predetermined size (250 mm long by 140 mm wide) was subjected to a heat treatment under conditions as follows. Specifically, the cut sheet was heated for 5 minutes in a heating furnace held at a furnace temperature of 900° C. so as to raise the sheet temperature to 900° C. in about 4 minutes. After a lapse of 5 minutes, the cut sheet was retrieved from the heating furnace and immediately cooled by sandwiching the cut sheet between dies. The average cooling rate in a temperature range of from 900° C. down to 200° C. was 20° C./second. After being cooled down to mom temperature, a tensile specimen was sampled from the cut sheet, and the tensile strength TS was measured. An acceptance criterion for tensile strength TS after quenching is 1370 MPa or more. A sample satisfying this criterion was evaluated as having satisfactory die hardenability.

The results of these measurements are indicated in Table 3 below. In Table 3, the term "percentage of other microstructures" refers to the percentage of microstructures other than ferrite and at least one of cementite and pearlite. A sample having a percentage of other microstructures of "0" refers to a sample having a total area percentage of ferrite and at least one of cementite and pearlite of 100%. This is also applied to Table 6 below.

TABLE 3

| | | Microstructure | | | Mechanical properties (before quenching) | | | | |
|---|---|---|---|---|---|---|---|---|---|
| Test No. | Steel | Average aspect ratio of ferrite grains (—) | Average major axis of cementite or pearlite grains (μm) | Percentage of other microstructures* (area %) | Yield point YP (MPa) | Tensile strength TS (MPa) | Total elongation EL (%) | Hole expansion ratio λ (%) | Strength after quenching Tensile strength TS (MPa) |
| 1 | A | 3.2 | 12.0 | 0 | 474 | 604 | 24 | 55 | 1513 |
| 2 | A | 2.9 | 8 | 0 | 445 | 557 | 28 | 59 | 1523 |
| 3 | A | 1.8 | — | B: 30%, M: 30% | 540 | 912 | 13 | 38 | 1534 |
| 4 | B | 1.9 | 4 | 0 | 410 | 541 | 24 | — | 783 |
| 5 | C | 2.0 | 4 | 0 | 391 | 511 | 27 | — | 810 |
| 6 | D | 2.5 | 6 | B: 2% | 371 | 481 | 26 | — | 1215 |
| 7 | G | 1.5 | — | B: 25%, M: 41% | 633 | 897 | 14 | — | 1574 |

*B: Bainite, M: Martensite

These results indicate as follows.

Steel A was a steel having a chemical composition within the range specified in the present invention and, when undergone a heat treatment under predetermined conditions, gave steel sheets having excellent cold workability (elongation and stretch flangeability) and satisfactory die hardenability (high tensile strength TS after quenching) (Test Nos. 1 and 2).

However, even the same Steel A, if undergone annealing at an excessively high annealing maximum temperature T and having a large A-value (Test No. 3), suffered from the formation of bainite and martensite in a large amount and failed to provide desired fine cementite and/or fine pearlite. In Table 3, the symbol "–" in "Average major axis of cementite or pearlite grains" refers to that these microstructures were not obtained. The resulting steel sheet failed to have good cold workability (elongation and stretch flangeability).

Steel B was a steel having excessively high contents of Si and Al and insufficient contents of Mn and boron (B) and gave, even when undergone annealing under suitable conditions as in Table 2, a steel sheet having an insufficient tensile strength TS after quenching (Test No. 4). In Table 3, the symbol "–" in "Hole expansion ratio λ" refers to that the test was not performed.

Steel C was a steel having an excessively high Si content and an insufficient Ti content. This steel failed to fix nitrogen (N) due to the insufficient Ti content, allowed boron (B) to be combined with nitrogen (N), and gave a steel sheet having an insufficient tensile strength TS after quenching (Test No. 5).

Steel D was a steel having an insufficient carbon (C) content and an excessively high Si content and gave a steel sheet having an insufficient tensile strength TS after quenching (Test No. 6).

Steel G was a steel having an excessively high Mn content, suffered from large amounts of bainite and martensite even when undergone annealing under suitably controlled conditions as in Table 2, and failed to provide desired fine cementite and/or fine pearlite. The resulting steel sheet had an insufficient elongation.

Experimental Example 2

Slabs were produced by continuous casting from steels (Steels E and F) having chemical compositions given in Table 4 below, and subjected, under conditions below, to hot rolling, acid-washing to remove scale on the surface layer, and further cold rolling (cold rolling to a thickness of 1.5 mm). The works were then subjected to a predetermined heat treatment (under predetermined annealing conditions) and to hot-dip galvanization in a continuous hot-dip galvanization line.

TABLE 4

| | Chemical composition* (in mass %) | | | | | | | | |
|---|---|---|---|---|---|---|---|---|---|
| Steel | C | Si | Mn | P | S | Cr | Al | Ti | B |
| E | 0.22 | 0.03 | 1.26 | 0.007 | 0.001 | 0.24 | 0.042 | 0.038 | 0.0032 |
| F | 0.22 | 0.20 | 1.35 | 0.008 | 0.001 | 0.26 | 0.040 | 0.038 | 0.003 |

*Balance: Iron and inevitable impurities

[Hot Rolling Conditions]

Heating temperature: 1220° C.

Finish temperature: 870° C.

Coiling temperature: 600° C.

Finish thickness: 3.0 mm (cold working ratio: 50%)

[Hot-Dip Galvanization Line]

The works were heated at a heating rate of 15° C./second to a predetermined temperature range (annealing maximum temperature T given in Table 5 below) and held at that temperature for a predetermined time (holding time at the annealing maximum temperature T). The heating was performed in a reducing atmosphere (non-oxidative atmosphere (mixed atmosphere of nitrogen and hydrogen)). The works were cooled from the annealing maximum temperature T down to 600° C. in 20 seconds, further cooled from 600° C. down to 460° C. at an average cooling rate of 20° C./second, held at the constant temperature of 460° C., and immersed in a plating bath. The plating bath had an Al content of 0.2%, and the target mass of coating (mass per unit area) was set to 70 g/m². No alloying treatment was performed in this process. The formed plating layer (galvanized layer) had an iron content of 1% or less. The heat treatment conditions (annealing conditions) together with the holding time t in the temperature range of from 700° C. to 800° C. and the A-value $\{[(T/100)^{3.5}] \times t\}$ are indicated in Table 5 below.

TABLE 5

| | | Annealing conditions | | | |
|---|---|---|---|---|---|
| Test No. | Steel | Annealing maximum temperature T (° C.) | Holding time at annealing maximum temperature T (second) | Holding time t in temperature range of from 700° C. to 800° C. (second) | A-value |
| 8 | E | 600 | 40 | — | 0 |
| 9 | E | 680 | 40 | — | 0 |
| 10 | E | 705 | 20 | 21 | 19538 |
| 11 | E | 720 | 35 | 39 | 39060 |
| 12 | E | 780 | 40 | 56 | 74220 |
| 13 | E | 790 | 40 | 58 | 80375 |
| 14 | E | 740 | 60 | 68 | 74958 |
| 15 | E | 750 | 15 | 25 | 28884 |
| 16 | E | 800 | 200 | 220 | 318594 |
| 17 | E | 710 | 6 | 8 | 7629 |
| 18 | E | 715 | 11 | 14 | 13684 |
| 19 | F | 760 | 30 | 42 | 50827 |
| 20 | F | 720 | 18 | 22 | 22034 |

The resulting specimens were subjected to observation of the base steel sheet microstructures, tensile tests, and hole expanding tests in the same manner as in Experimental Example 1 to examine mechanical properties (yield point YP, tensile strength TS, total elongation EL, and Hole expansion ratio λ). The specimens were also examined on strength (tensile strength TS) after quenching (heat treatment test) in the same manner as in Experimental Example 1. In addition, the specimens were examined on plating appearance according to the following method.

[Method for Plating Appearance Evaluation]

On an outgoing inspection table in the galvanization line, whether imperfect plating is present or not was examined by visual observation. A specimen having no surface defects per 200 m in length of the steel sheet was evaluated as having good plating appearance (○); a specimen having one to four surface defects was evaluated as having somewhat poor plating appearance (Δ); and a specimen having five or more surface defects was evaluated as having poor plating appearance (x).

The results are indicated in following Table 6.

specified in the present invention and were produced under predetermined heat treatment conditions. The resulting steel sheets exhibited excellent cold workability (elongation and stretch flangeability) and satisfactory die hardenability (high tensile strength TS after quenching) and had good plating appearance (surface quality).

By contrast, Test Nos. 8, 9 and 16 to 20 were comparative examples not satisfying one or more of conditions specified in the present invention and gave steel sheets poor in one or more of the properties.

Specifically, Test Nos. 8 and 9 employed Steel E satisfying the conditions specified in the present invention, but underwent annealing at an annealing maximum temperature T of lower than the temperature specified in the present invention (and had an A-value of zero). They failed to provide desired microstructures containing equiaxed ferrite in combination with fine cementite and/or fine pearlite. The resulting steel sheets had insufficient cold workability (elongation and stretch flangeability). In these samples, little cementite was formed. In addition, the steel sheets contained sporadically dispersing minute unplated areas due to insufficient reduction of the surface during annealing and failed to give good plating appearance (surface quality).

Test No. 16 also employed Steel E satisfying the conditions specified in the present invention, but had a large A-value, and suffered from the formation of a large amount of austenite during annealing. This caused the formation of bainite and martensite during the subsequent cooling process. The resulting steel sheet had an excessively high tensile strength TS before quenching and suffered from poor cold workability (elongation and stretch flangeability).

Test No. 17 also employed Steel E satisfying the conditions specified in the present invention, but underwent annealing for an insufficient holding time t in the temperature range of from 700° C. to 800° C., and had an excessively low A-value. The resulting steel sheet had an average aspect ratio of ferrite grains of more than 4.0, had an average major axis of cementite/pearlite grains of more than 20 μm, and had inferior cold workability (elongation and stretch flangeability). In this sample, little cementite was formed.

TABLE 6

| | | Microstructure | | | Mechanical properties (before quenching) | | | | Strength after quenching | |
|---|---|---|---|---|---|---|---|---|---|---|
| Test No. | Steel | Average aspect ratio of ferrite grains (—) | Average major axis of cementite or pearlite grains (μm) | Percentage of other microstructures* (area %) | Yield point YP (MPa) | Tensile strength TS (MPa) | Total elongation EL (%) | Hole expansion ratio λ (%) | Tensile strength TS (MPa) | Surface quality |
| 8 | E | 6.2 | 32 | 0 | 598 | 743 | 15 | 32 | 1521 | X |
| 9 | E | 4.5 | 24 | 0 | 558 | 689 | 18 | 36 | 1510 | Δ |
| 10 | E | 3.8 | 18 | 0 | 520 | 670 | 19 | 41 | 1501 | ○ |
| 11 | E | 2.6 | 17 | 0 | 474 | 604 | 23 | 43 | 1513 | ○ |
| 12 | E | 2.1 | 3 | 0 | 445 | 557 | 26 | 53 | 1523 | ○ |
| 13 | E | 1.8 | 3 | 0 | 405 | 543 | 27 | 62 | 1528 | ○ |
| 14 | E | 1.8 | 4 | 0 | 421 | 540 | 29 | 61 | 1548 | ○ |
| 15 | E | 3.7 | 15 | 0 | 520 | 640 | 21 | 41 | 1540 | ○ |
| 16 | E | 1.8 | — | B: 35%, M: 30% | 607 | 1012 | 13 | 26 | 1540 | ○ |
| 17 | E | 4.5 | 24 | 0 | 539 | 723 | 15 | 36 | 1540 | ○ |
| 18 | E | 4.8 | 15 | 0 | 513 | 702 | 16 | 35 | 1524 | ○ |
| 19 | F | 1.2 | 14 | B: 2% | 560 | 615 | 24 | 49 | 1511 | X |
| 20 | F | 3.5 | 18 | 0 | 540 | 680 | 20 | 41 | 1524 | X |

*B: Bainite, M: Martensite

These results demonstrate as follows. Test Nos. 10 to 15 were examples that employed Steel E satisfying conditions Test No. 18 employed Steel E satisfying the conditions as specified in the present invention, underwent annealing at an annealing maximum temperature T for a holding time t in a temperature range of from 700° C. to 800° C. both within ranges specified in the present invention, but had a small A-value of less than 15000. The resulting steel sheet had an average aspect ratio of ferrite grains of more than 4.0 and had inferior cold workability (elongation and stretch flange ability).

Test Nos. 19 and 20 employed Steel F having a Si content greater than the range specified in the present invention. The resulting steel sheet suffered from sporadically dispersing unplated areas having a diameter of from about 1 to about 3 mm and suffered from extremely poor plating appearance, though having a tensile strength TS after quenching at a certain level.

Figure 1:
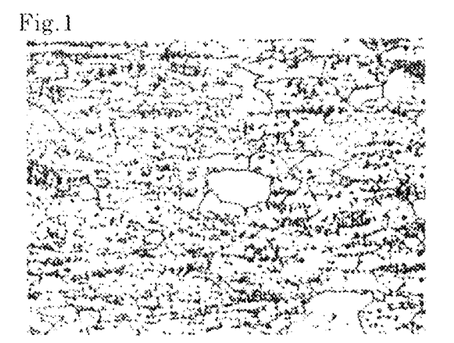
FIG. 1 is an optical photomicrograph illustrating a microstructure in a steel sheet of Test No. 14 (Example).
Figure 2:
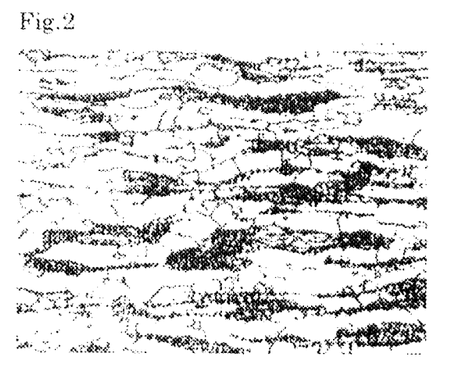
FIG. 2 is an optical photomicrograph illustrating a microstructure in a steel sheet of Test No. 20 (Comparative Example).

For the sake of reference, the microstructure of the steel sheet of Test No. 14 (Example) is indicated as optical photomicrographs in FIG. 1. And the microstructure of the steel sheet of Test No. 20 (Comparative Example) is indicated as optical photomicrographs in FIG. 2. The widths of these photomicrographs each measure 80 μm.

The present application claims priority based on Japanese Patent Application No. 2012-83009 filed on Mar. 30, 2012. The entire contents of the application of Japanese Patent Application No. 2012-83009 filed on Mar. 30, 2012 are incorporated herein by reference.

The invention claimed is:

1. A hot-dip galvanized steel sheet for stamping having excellent cold workability, die hardenability, and surface quality, the hot-dip galvanized steel sheet comprising:
a base steel sheet; and,
a hot-dip galvanized layer formed on a surface of the base steel sheet,
the base steel sheet comprising:
carbon (C) in a content of from 0.20% (meaning "mass %"; hereinafter, the same applies the chemical composition) to 0.24%;
silicon (Si) in a content of from greater than 0% to 0.1%;
manganese (Mn) in a content of from 1.20% to 1.5%;
phosphorus (P) in a content of from greater than 0% to 0.02%;
sulfur (S) in a content of from greater than 0% to 0.002%;
chromium (Cr) in a content of from 0.21% to 0.5%;
titanium (Ti) in a content of from 0.02% to 0.05%;
solute aluminum (sol. Al) in a content of from 0.02% to 0.06%; and
boron (B) in a content of from 0.001% to 0.005%, with the balance consisting of iron and inevitable impurities,
wherein the base steel sheet has a microstructure comprising:
equiaxed ferrite as a main phase in combination with cementite and/or pearlite,
a total content of other micro structures is 5 area % or less based on a total area of all microstructures;
equiaxed ferrite having an average aspect ratio of 4.0 or less; and
cementite and/or pearlite each having an average major axis of grains of 20 μm or less.

2. A method for producing a hot-dip galvanized steel sheet for stamping having excellent cold workability, die hardenability, and surface quality, the method comprising the steps of:
heating a steel slab to a temperature of from 1150° C. to 1300° C., the steel slab having the chemical composition as defined in claim 1;
hot-rolling the heated steel slab at a finish temperature of from 850° C. to 950° C. to give a steel sheet;
coiling the steel sheet after hot rolling at a temperature in the range of from 550° C. to 700° C.;
cold rolling the steel sheet after coiling to a rolling reduction of from 30% to 70%;
annealing the steel sheet after cold rolling at an annealing maximum temperature of from 700° C. to 800° C. for a holding time in a temperature range of from 700° C. to 800° C. of from 10 seconds to 600 seconds;
further cooling the steel sheet after annealing to 500° C. or lower; and
performing hot-dip galvanization on the steel sheet after cooling,
wherein the annealing is performed under such conditions as to satisfy a condition specified by Expression (1):

$$15000 \leq [(T/100)^{3.5}/x t \leq 100000 \qquad (1)$$

where T represents the annealing maximum temperature (° C.); and t represents the holding time (second) in a temperature range of from 700° C. to 800° C.

3. The hot-dip galvanized steel sheet according to claim 1, wherein the base steel sheet has a microstructure comprising cementite having an average major axis grains of from 1 to 20 μm.

4. The hot-dip galvanized steel sheet according to claim 1, having a strength after quenching tensile strength of 1,370 mPa or more.

5. The hot-dip galvanized steel sheet according to claim 1, wherein the base steel sheet has a microstructure comprising cementite and/or pearlite each having an average major axis grains of from 3 to 18 μm.

6. The hot-dip galvanized steel sheet according to claim 1, wherein the base steel sheet has a microstructure that comprises only ferrite grains and at least one of cementite grains and pearlite grains.

7. The hot-dip galvanized steel sheet according to claim 1, wherein the base steel sheet has a microstructure including ferrite grains having an aspect ratio of from 1.8 to 3.8.

8. The hot-dip galvanized steel sheet according to claim 1, wherein the base steel sheet comprises at least one of cementite and pearlite grains at grain boundaries of ferrite grains.

9. The hot-dip galvanized steel sheet according to claim 1, wherein the base steel sheet has a microstructure that does not comprise pearlite grains.

10. The method of claim 2, wherein the annealing includes a maximum annealing temperature of 720-780° C.

11. The method of claim 2, wherein the annealing includes a holding time at a maximum annealing temperature of from 40 to 50 seconds.

12. The method of claim 2, wherein the annealing includes a holding time in a temperature range of from 700 to 800° C. of from 21 to 68 seconds.

* * * * *